March 5, 1968     L. J. SUNDBLOM     3,371,860
CONTROL MECHANISM FOR METERING DEVICES
Filed Feb. 1, 1967     4 Sheets-Sheet 1
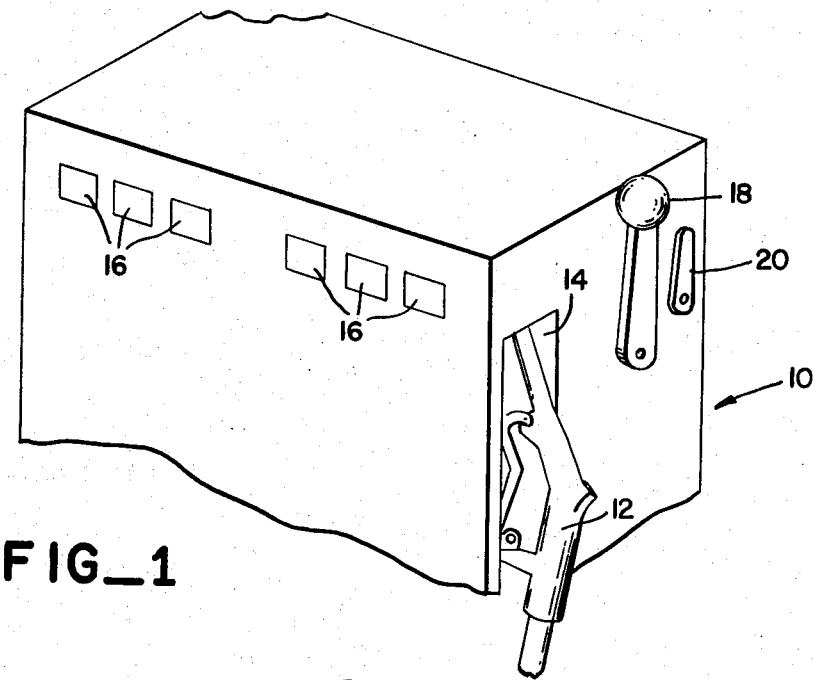
FIG_1
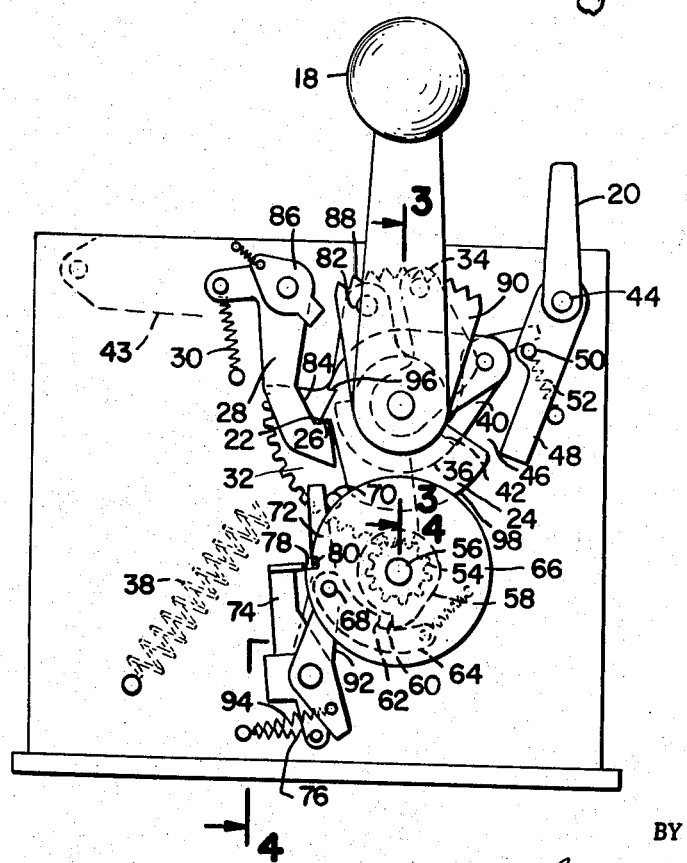
FIG_2
INVENTOR.
LEIF J. SUNDBLOM
BY
Mellin, Moore + Weissenberger
ATTORNEYS

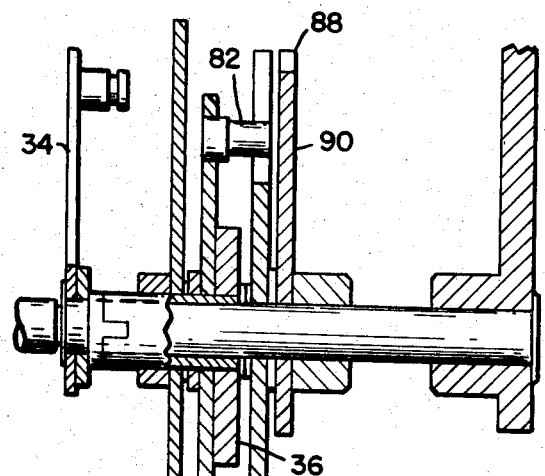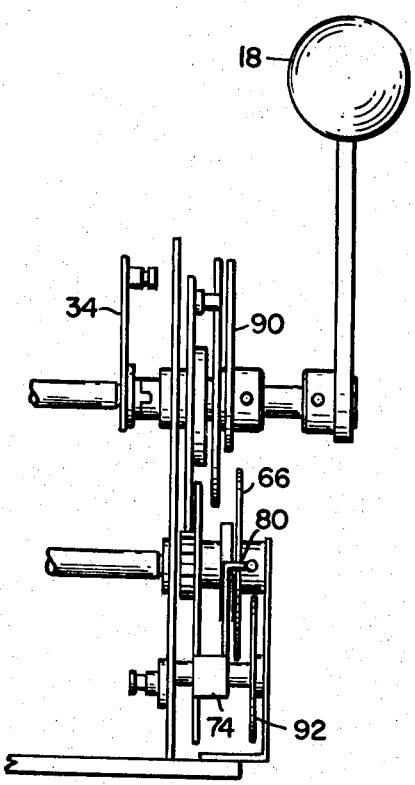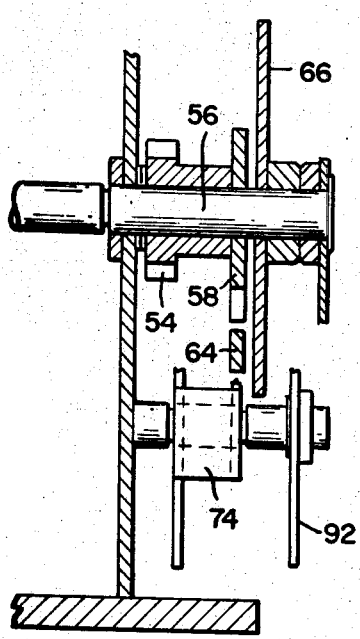

March 5, 1968     L. J. SUNDBLOM     3,371,860
CONTROL MECHANISM FOR METERING DEVICES
Filed Feb. 1, 1967     4 Sheets-Sheet 3
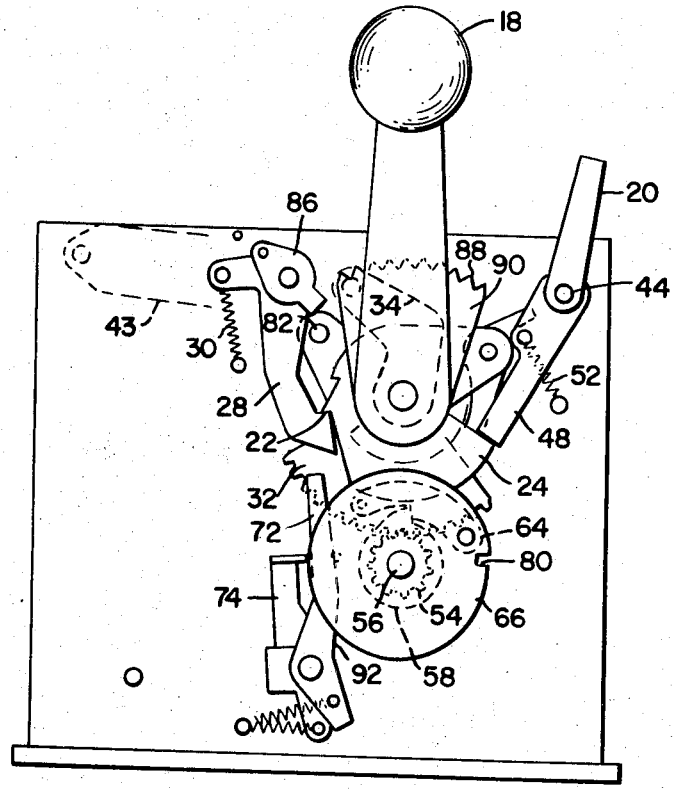
FIG_5
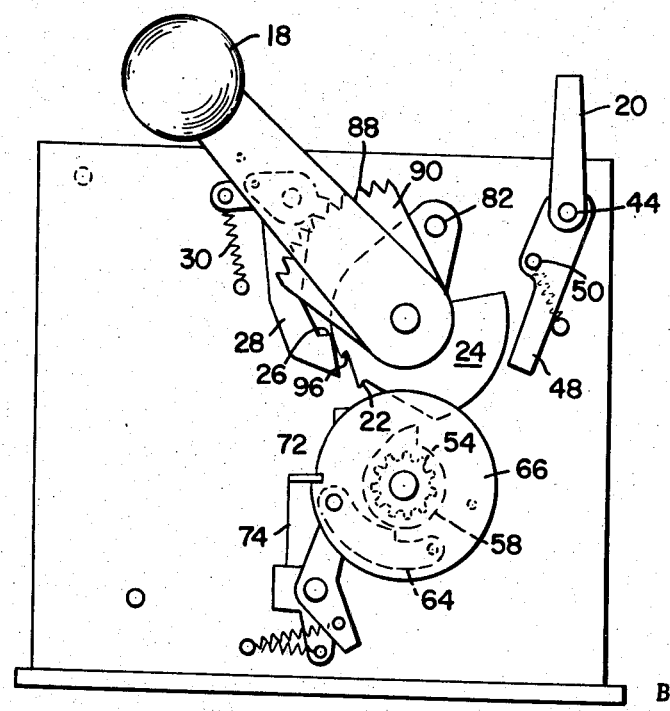
FIG_8
INVENTOR.
LEIF J. SUNDBLOM
BY
ATTORNEYS March 5, 1968  L. J. SUNDBLOM  3,371,860
CONTROL MECHANISM FOR METERING DEVICES
Filed Feb. 1, 1967  4 Sheets-Sheet 4
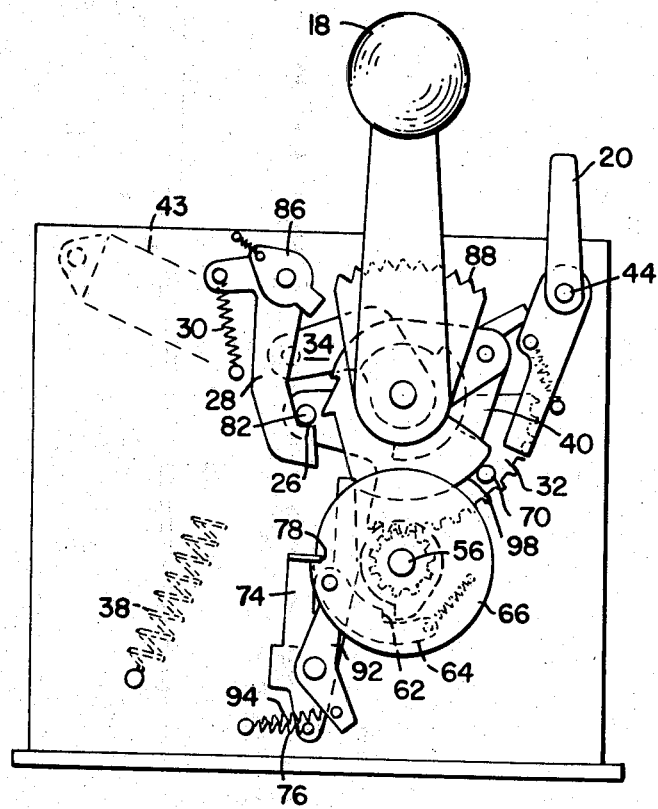
FIG_6
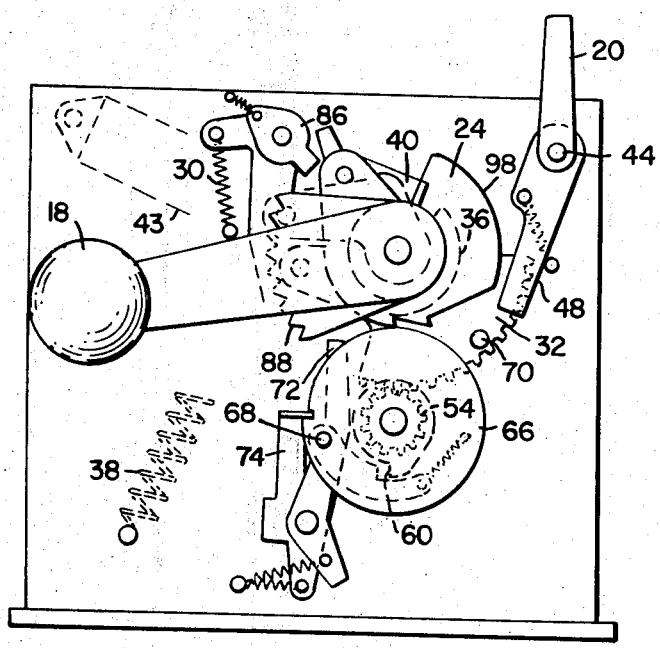
FIG_7
INVENTOR.
LEIF J. SUNDBLOM
BY
Mellin, Moore + Weissenberger
ATTORNEYS

United States Patent Office 3,371,860
Patented Mar. 5, 1968

3,371,860
CONTROL MECHANISM FOR METERING DEVICES
Leif J. Sundblom, Castro Valley, Calif., assignor to Rockwell Manufacturing Company, Statesboro, Ga., a corporation of Pennsylvania
Filed Feb. 1, 1967, Ser. No. 613,333
4 Claims. (Cl. 235—94)

ABSTRACT OF THE DISCLOSURE

Manual controls and interlock means are provided for sequentially maintaining a display of a registered amount on the face of a computing meter such as a gasoline pump, when the pump is "off," releasing at will a resetting mechanism independent of any movement of the control lever, setting the control lever to a registering position, and winding the reset mechanism for the next reset operation by the return of the control lever to the off position.

Background of the invention

This invention relates to a control mechanism for metering devices, and more particularly a jam-proof mechanism for controlling and resetting a device such as a gasoline pump.

For accuracy of delivery and of price or gallonage registry, it is essential that the controls by which a metering device such as a gasoline pump can be put into condition for a delivery and prepared for a new subsequent delivery be effective to carry out the desired motions without any possibility of jamming or damaging the mechanism by mishandling of the external control elements by the operator. At the same time, it is necessary to provide interlocks which will permit the various operations involved to be carried out only in their proper sequence.

Summary of the invention

The present invention provides a mechanism which carries out the following functions:

If the rest position is to be taken as the position in which the pump is off and the registrations of the previous delivery are still showing on the dials, then the mechanism must first require resetting of the dials to zero prior to beginning a new delivery, then enable a new delivery to take place, and permit shutting off the pump at the end of the delivery without canceling the registration showing on the meter dials.

It is the object of this invention to provide a mechanism for carrying out the above-described sequence of operations, with appropriate interlocks being provided for assuring that the operations can be carried out only in the sequence prescribed, and that the operations themselves cannot be jammed by misoperation of the control elements.

It is another object of the invention to provide a mechanism of the type described in which the resetting operation is carried out by spring-powered means which, once released, cannot be stopped in mid-operation, and which are automatically rewound before they can be released again.

Brief description of the drawings

FIG. 1 is a perspective view of a typical device incorporating the control mechanism of this invention;

FIG. 2 is a side elevation showing the position of the components when a pump is in the off position and the previous registration is still showing on the meter dials;

FIG. 3 is a vertical section along line 3—3 of FIG. 2;

FIG. 4 is a vertical section along line 4—4 of FIG. 2;

FIG. 5 is a figure similar to FIG. 2 but showing the mechanism at a time when the clear trip lever has been tripped and the registry clearing or resetting mechanism has gone through one-half of its cycle;

FIG. 6 is a view similar to FIG. 5 but showing the elements in condition when the resetting of the dials to zero has been completed;

FIG. 7 is a figure similar to FIG. 2 but showing the mechanism in the condition in which it is during a delivery;

FIG. 8 is a view similar to FIG. 2 but showing the mechanism in the condition in which the control lever is half-way between its delivery position and its off position; and FIG. 9 is a vertical section along line 9—9 of FIG. 2.

Description of the preferred embodiment

Referring first to FIG. 1, it will be noted that the pump 10 is equipped with a nozzle 12 which normally rests in a nozzle booth 14 between deliveries. Dials 16 register the gallonage and price of any given delivery, and a control lever 18 is provided to control the operation of the pump and register. A clear trip lever 20 is provided for clearing the indication of a previous delivery at the beginning of a new delivery. It will be understood that due to the relative positions of nozzle booth 14 and control lever 18, the nozzle 12 has to be removed from the nozzle booth 14 before the control lever 18 can be moved forward in FIG. 1, and similarly the control lever 18 has to be returned to the off position in which it is shown in FIG. 1 before the nozzle 12 can be replaced in the nozzle booth 14.

Referring now to FIG. 2, the mechanism is shown in its off position, with the previous register indications still showing on the dials 16, as is depicted in FIG. 1.

In the condition of FIG. 2 counterclockwise movement of the control lever 18 is prevented by engagement of the shoulder 22 of control lever cam 24 with the shoulder 26 of the latch 28. The control lever cam 24 is keyed to the control lever 18, and the latch 28 is biased against the control lever cam 24 by the spring 30. The gear segment 32, lever 34, and cam 36, all of which are keyed together, are held against the tension of spring 38 by engagement of the pawl 40 with the shoulder 42 of cam 36. Consequently, the mechanism is at rest and nothing can move.

If it is now desired to clear the register indications on the dials 16, the trip lever 20 is momentarily rotated clockwise about pin 44. The notch 46 in control lever cam 24 allows arm 48, which is keyed to trip lever 20, to move sufficiently far in a clockwise direction for pin 50 to push pawl 40 out of engagement with shoulder 42. As soon as trip lever 20 is released, the spring 52 returns it to the position shown in FIG. 2.

As soon as the pawl 40 clears shoulder 42 of cam 36, the assembly consisting of lever 34, gear segment 32 and cam 36, is free to rotate in a counterclockwise direction under the influence of spring 38. Dashpot 43 connected between the frame of the device and lever 34 controls the speed of movement of segment 32 and prevents damage to the resetting mechanism from an over-rapid actuation. As the gear segment 32 turns counterclockwise, its teeth turn pinion 54 in a clockwise direction about shaft 56. The reset cam 58 is keyed to the pinion 54 and rotates with it. As will be shown from a comparison of FIGS. 2 and 5, the shoulder 60 of reset cam 58 engages the shoulder 62 of ratchet pawl 64 and causes the reset mechanism drive 66, to which ratchet pawl 64 is attached by pin 68, to rotate in a clockwise direction.

The rotation of the reset mechanism drive disc 66 is transmitted to an appropriate reset mechanism by any appropriate means. For example, the reset mechanism shown in my copending application entitled Meter Dial Resetting Mechanism, Ser. No. 605,689, filed Dec. 29, 1966 may be used, in which case the motion of the reset mechanism drive 66 is transmitted to the input shaft 36 of that application.

The design of the reset mechanism drive 66 of this application is such that one resetting or clearing operation is accomplished by one full clockwise revolution of the reset mechanism drive 66.

Immediately after the shoulder 60 of reset cam 58 has picked up the shoulder 62 of ratchet pawl 64 and has started to turn the reset mechanism drive 66, the rightward movement of pin 70 of gear segment 32 permits arm 72 of the single cycle control latch 74 to move to the right under the bias of spring 76. This rightward movement continues until shoulder 78 of the single cycle control latch 74 comes to rest against the rim of the reset mechanism drive disc 66. It will be seen that as soon as the reset mechanism drive 66 has completed one full revolution, shoulder 78 of the single cycle control latch 74 will drop off the rim of disc 66 into the kerf 80 where it blocks any further motion of reset mechanism drive 66. The mechanism is now in the condition of FIG. 6.

During the counterclockwise motion of gear segment 32, pin 82 engages shoulder 84 of latch 28 and shoves latch 28 out of the way against the bias of spring 30. The consequent disengagement of shoulder 26 of latch 28 from shoulder 22 of control lever cam 24 allows the control lever 18 to be moved out of its off position in a counterclockwise direction. The pump can now be turned on by pulling the control lever 18 forward and down in FIG. 1 until it assumes the position shown in FIG. 7. As soon as the counterclockwise movement of control lever 18 has been initiated, the bi-directional anti-reversal pawl 86 engages the serrated surface 88 of the anti-reversal segment 90 which is keyed to the control lever 18. Consequently, once the counterclockwise motion of control lever 18 has been substantially initiated, lever 18 cannot be returned to the off position without first being pulled all the way to the on position of FIG. 7.

With the mechanism in the condition of FIG. 7, a delivery of gasoline or other metered fluid can take place. When the delivery is completed and it is desired to replace the delivery hose nozzle 12 in the nozzle booth 14, the control lever 18 must first be returned to the off position by moving it in a clockwise direction.

Shortly after the initiation of the clockwise motion of control lever 18, when the bi-directional anti-reversal pawl 86 has had a chance to engage the serrated surface 88 of anti-reversal segment 90, the pawl 40 engages shoulder 42 of cam 36. As the clockwise motion of the control lever 18 now moves toward the position of FIG. 8, it will be noted that the pawl 40 pushes the cam 36 ahead of it in a clockwise direction; and since cam 36, lever 34 and gear segment 32 are all keyed together, the spring 38 is tensioned by lever 34 during this motion, while the gear segment 32 rotates the pinion 54 in a counterclockwise direction.

The resultant leftward motion of pin 70 on gear segment 32 eventually results in the engagement of arm 72 and the withdrawal of the single cycle control latch 74 from the kerf 80 of the reset mechanism drive 66. Counterclockwise motion of the reset mechanism drive 66 under any frictional engagement of the surfaces of reset cam 58 and ratchet pawl 64 is, however, prevented by the presence of stop pawl 92 which is biased into blocking relation with respect to pin 68 by the spring 94.

At the same time, the removal of pin 82 from engagement with surface 84 of latch 28 allows latch 28 to be biased against the surface of control lever cam 24 under the influence of spring 30.

Before the bi-directional anti-reversal pawl 86 leaves the serrated surface 88 of the anti-reversal segment 90, the shoulder 26 of latch 28 clicks past the shoulder 96 of control lever cam 24. The purpose of the shoulder 96 is to prevent the lever 18 from being returned to the horizontal position once the bi-directional anti-reversal pawl has become disengaged at the end of the clockwise movement of control lever 18. With a slightly further clockwise movement of control lever 18, the control lever cam 24 is turned far enough to allow engagement of shoulder 26 of latch 28 with shoulder 22 of control lever cam 24, and the device is back in the position of FIG. 2, ready for a new cycle of operation.

It will be understood that the raised surface 98 of control lever cam 24 blocks the movement of arm 48 in all positions of the control lever 18 except the off position, and consequently, the register dials cannot be cleared unless the lever 18 is in the full off position where shoulder 26 is in engagement with shoulder 22.

It will be seen that the present invention provides a simple and jam-proof way of accomplishing the functions inherent in the operation of a registering meter apparatus such as a gasoline pump. Obviously the teachings of this invention can be carried out in various ways of which the embodiment described herein is merely illustrative. Therefore, I do not desire to be limited by the embodiment shown and described, but only by the scope of the following claims:

I claim:
1. A control mechanism for metering devices having resettable counters, comprising:
    (a) control lever means;
    (b) clear trip lever means;
    (c) cam means operatively associated with said control lever means;
    (d) independently rotatable spring-powered means;
    (e) reset mechanism drive means;
    (f) said control lever means being reciprocably movable between an "on" and an "off" position, movement of said control lever from "on" to "off" winding the spring of said spring-powered means, and said clear trip lever means being arranged to release said independently rotatable means to drive said reset mechanism drive means through one full revolution under the power of its said spring;
    (g) interlock means preventing operation of said clear trip lever means except when said control lever means is in the "off" position, and preventing movement of said control lever means to the "on" position until said clear trip lever has been tripped; and
    (h) bi-directional continuously acting anti-reversal means to prevent reversal of the direction of movement of said control means prior to the completion of a movement once said movement has been initiated in either direction.

2. A control mechanism for metering devices having resettable counters, comprising:
    (a) control lever means;
    (b) clear trip lever means;
    (c) cam means operatively associated with said control lever means;
    (d) independently rotatable spring-powered means;
    (e) reset mechanism drive means;
    (f) said control lever means being reciprocably movable between an "on" and an "off" position, movement of said control lever from "on" to "off" winding the spring of said spring-powered means, and said clear trip lever means being arranged to release said independently rotatable means to drive said reset mechanism drive means through one full revolution under the power of its said spring;
    (g) interlock means preventing operation of said clear trip lever means except when said control lever means is in the "off" position, and preventing movement of said control lever means to the "on" position until said clear trip lever has been tripped; and
    (h) said independently rotatable means including a reciprocably rotatable gear segment and pinion means engageable therewith.

3. A control mechanism according to claim 2, in which said pinion means are connected to said reset mechanism drive means through a ratchet member so as to drivingly engage said reset mechanism drive means in only one direction of motion.

4. A control mechanism according to claim 3, further comprising stop means arranged to stop said reset mechanism drive means at the end of one full revolution, pinion means stopping short of one full revolution of said drive means, and said drive means coasting to its full revolution position by inertia.

References Cited

UNITED STATES PATENTS

| | | | |
|---|---|---|---|
| 2,814,444 | 11/1957 | Bliss | 235—144 |
| 2,833,477 | 5/1958 | Bliss et al. | 235—144 |
| 2,836,363 | 5/1958 | Wild | 235—144 |
| 3,188,005 | 6/1965 | Wright et al. | 235—144 |
| 3,216,659 | 11/1965 | Ambler et al. | 235—144 |

RICHARD B. WILKINSON, *Primary Examiner.*

S. A. WAL, *Assistant Examiner.*